United States Patent [19]
Miller

[11] Patent Number: 5,497,436
[45] Date of Patent: Mar. 5, 1996

[54] SYSTEM AND METHOD FOR BIT-MASKED COLOR SIGNAL SCALING

[75] Inventor: Gavin S. P. Miller, Palo Alto, Calif.

[73] Assignee: Apple Computer Inc., Cupertino, Calif.

[21] Appl. No.: 278,934

[22] Filed: Jul. 22, 1994

[51] Int. Cl.⁶ .................................................. G06K 9/32
[52] U.S. Cl. .......................... 382/298; 348/275; 358/517; 364/715.07
[58] Field of Search ..................... 382/43, 6, 47, 382/44, 17; 395/131, 132, 102, 139, 166; 364/715.09, 715.07, 715.11; 358/522, 37, 44, 310, 528, 525, 518, 517; 359/3; 348/273, 275

[56] References Cited

U.S. PATENT DOCUMENTS

| | | | |
|---|---|---|---|
| 4,525,737 | 6/1985 | Hashimoto et al. | 358/44 |
| 4,718,089 | 1/1988 | Hayashi et al. | 382/17 |
| 4,825,388 | 4/1989 | Dailey et al. | 382/47 |
| 4,924,413 | 5/1990 | Suwannukul | 395/131 |
| 4,962,419 | 10/1990 | Hibbard et al. | 358/37 |
| 5,129,060 | 7/1992 | Pfeiffer et al. | 395/166 |
| 5,228,120 | 7/1993 | Farr et al. | 395/131 |
| 5,241,658 | 8/1993 | Masterson et al. | 395/131 |

Primary Examiner—Leo Boudreau
Assistant Examiner—Anh Hong Do
Attorney, Agent, or Firm—Carr, DeFilippo & Ferrell

[57] ABSTRACT

A system for bit-masked color signal scaling comprises a processing unit, a display device, and a memory wherein a scaling unit, an image memory, a multiplication image memory, an approximation image memory, an approximation multiplication image memory, and a scaled image memory reside. The scaling unit retrieves a color signal having a red channel signal, a green channel signal, and a blue channel signal from the image memory, and performs either an exact or an approximate bit-masked color signal scaling. A method for exact bit-masked color signal scaling comprises the steps of: generating a staggered masking signal; generating a center masking signal; generating a staggered result signal; generating a center result signal; and adding the staggered result signal and the center result signal to produce a scaled color signal. A method for approximate bit-masked color signal scaling comprises the steps of: generating an approximation masking signal; generating an approximation color signal; generating an approximation multiplication signal; and multiplying the approximation color signal and the approximation multiplication signal to produce an approximate scaled color signal.

19 Claims, 10 Drawing Sheets

SYSTEM AND METHOD FOR BIT-MASKED COLOR SIGNAL SCALING

BACKGROUND OF THE INVENTION

1. Field of the Invention

The present invention relates generally to systems and methods for image processing, and more particularly to systems and methods for scaling color signals within an image. Still more particularly, the present invention is a system and method for bit-masked color signal scaling.

2. Description of the Background Art

In image processing applications, an image is a set of picture elements, or pixels. Each pixel is represented by a computer word that contains a color signal. Referring now to FIG. 1A, a block diagram of a prior art embodiment of a color signal within a computer word is shown. The color signal comprises a red channel signal, a green channel signal, and a blue channel signal that occupy a left channel signal position, a center channel signal position, and a right channel signal position within the computer word. Each channel signal occupies or spans a predetermined number of bits within the computer word, referred to herein as the channel signal size. Those skilled in the art will recognize that the color signal shown in FIG. 1A represents a pixel according to the conventional Red-Green-Blue (RGB) pixel format. As shown in FIG. 1A, the size of the computer word is defined herein as 32 bits, and the channel signal size is defined herein as 8 bits. Thus, the blue channel signal spans bits b0 through b7 within byte 0 in FIG. 1A. Similarly, the green channel signal spans bits g0 through g7 within byte 1, and the red channel signal spans bits r0 through r7 within byte 2. Those skilled in the art will also recognize that additional pixel-specific information may be present in those portions of the computer word that do not contain the color signal, such as in byte 3 in FIG. 1A.

Before a given image is displayed, image interpolation, image compositing, and/or image shading operations may be required. In the event that such operations are required, each channel signal within each color signal must be scaled according to a multiplication signal associated with the color signal. The set of multiplication signals used to scale the color signals within the image is referred to herein as a multiplication image. Referring now to FIG. 1B, a block diagram of a prior art multiplication signal within a computer word is shown. Preferably, each multiplication signal occupies a number of bits equal to the channel signal size. Thus, in FIG. 1B, the multiplication signal spans eight bits, namely, bits m0 through m7 in byte 0 of the computer word, because the channel signal size is eight bits.

In the prior art, when a color signal is scaled according to a multiplication signal, each channel signal is "unpacked", or loaded into its own computer word. Next, each unpacked channel signal is multiplied by the multiplication signal, and is then normalized according to the channel signal size. Finally, each unpacked channel signal is "packed", or loaded, into the appropriate position within a computer word, thereby forming the scaled color signal.

Presently, image sizes of 1024 by 768 pixels are common. As technology improves, images will contain ever-greater numbers of pixels in an effort to improve image resolution. Each of the operations performed during color signal scaling requires a given amount of computational time to complete. Multiplication operations are particularly time-intensive. For example, a 32-bit multiplication operation may be more than ten times slower than a simpler 32-bit operation such as an addition operation.

As can be seen from the preceding discussion, the scaling of a color signal having a red channel signal, a green channel signal, and a blue channel signal requires three multiplication operations. Thus, for an image having 1024 by 768 pixels, more than 2 million multiplications are required for a single scaling of the color signals within the image. Some image processing applications, particularly those that are interactive, may require that the color signals within an image be scaled multiple times and as rapidly as possible. Due to the very large number of operations that must be performed, however, the overall amount of time required in the prior art to perform a single scaling upon the set of color signals within an image is undesirably long, even for small images.

What is needed is a means for color signal scaling that significantly reduces the time required to scale the set of color signals within an image.

SUMMARY OF THE INVENTION

The present invention is a system and method for bit-masked color signal scaling. The system of the present invention comprises a processing unit, a display device, and a memory wherein an image memory, a multiplication image memory, an approximation image memory, an approximation multiplication image memory, and a scaling unit reside. In the present invention, an image comprises a set of color signals. Each color signal has a red channel signal within a left channel signal position, a green channel signal within a center channel signal position, and a blue channel signal within a right channel signal position. Each of the red, green, and blue channel signals occupy or span an identical number of bit positions referred to as the channel signal size.

The scaling unit scales each color signal within an image according to a corresponding multiplication signal within a multiplication image. During the scaling, the image and the multiplication image respectively reside within the image memory and the multiplication image memory. The scaling unit selectively performs an exact bit-masked color signal scaling or an approximate bit-masked color signal scaling upon request. In the exact bit-masked color signal scaling, the scaling unit generates a staggered masking signal and a center masking signal. The staggered masking signal comprises a left-position masking signal to mask the left channel signal position within a computer word, a right-position masking signal to mask the right channel signal position within the computer word, and binary "0" signals throughout the remaining portions of the computer word. The center masking signal comprises a center-position masking signal to mask the center channel signal position within the computer word, and binary "0" signals throughout the remaining portions of the computer word.

After generating the staggered masking signal and the center masking signal, the scaling unit masks a first computer word within the image with the staggered masking signal to produce a staggered color signal. The scaling unit then multiplies the staggered color signal by a corresponding multiplication signal obtained from a multiplication image, and normalizes the result according to the channel signal size, thereby producing a staggered result signal.

The scaling unit also masks the aforementioned computer word with the center masking signal to produce a center color signal. The scaling unit next multiplies the center color signal by the multiplication signal and normalizes the multiplication result according to the channel signal size, thereby generating a center result signal. The scaling unit then adds the staggered result signal and the center result signal to produce a scaled color signal. A scaled color signal is produced in this manner for each computer word within the image.

Because the red channel signal and the blue channel signal are separated by binary "0" signals throughout the center channel signal position, their multiplication by the multiplication signal is performed simultaneously. The center color signal is also multiplied by the multiplication signal. Thus, in the exact color signal scaling, only two multiplications are required for each color signal in the image, resulting in a large reduction in the time required to scale each color signal within the image when compared to the prior art.

To perform the approximate bit-masked color signal scaling, the scaling unit first generates an approximation masking signal. The approximation masking signal comprises binary "1" signals within a predetermined number of lowest-order bit positions within each of the left channel signal position, the center channel signal position, and the right channel signal position, and binary "0" signals in the remaining positions within a computer word.

For each color signal in the image, the scaling unit creates an approximation color signal by right-shifting the color signal by a number of bit positions equal to the predetermined number of lowest-order bit positions in each of the approximation masking signal's left, center, and right channel signal positions that contain binary "1" signals; and by masking the shifted color signal with the approximation masking signal. The set of approximation color signals generated for an image are referred to as an approximation image. The scaling unit stores the approximation image in the approximation image memory.

For each multiplication signal within the multiplication image, the scaling unit creates an approximation multiplication signal. The approximation multiplication signal is created through a right-shift of the multiplication signal by a number of bit positions equal to the channel signal size minus the predetermined number of bit positions that contain binary "1" signals in each of the left, center, and right channel signal positions in the approximation masking signal. The set of approximation masking signals generated for a multiplication image are referred to herein as an approximation multiplication image. The approximation multiplication image is stored in the approximation multiplication image memory.

The scaling unit multiplies each approximation color signal by a corresponding approximation multiplication signal to produce an approximate scaled color signal. Thus, only one multiplication is required for each approximate color signal generated from a color signal in the image. The scaling of the color signals within an image according to the approximate color signal is particularly useful in an interactive environment when the color signals in the image must be rapidly scaled in response to repeated multiplication image modifications.

DETAILED DESCRIPTION OF THE PREFERRED EMBODIMENTS

Figure 2:
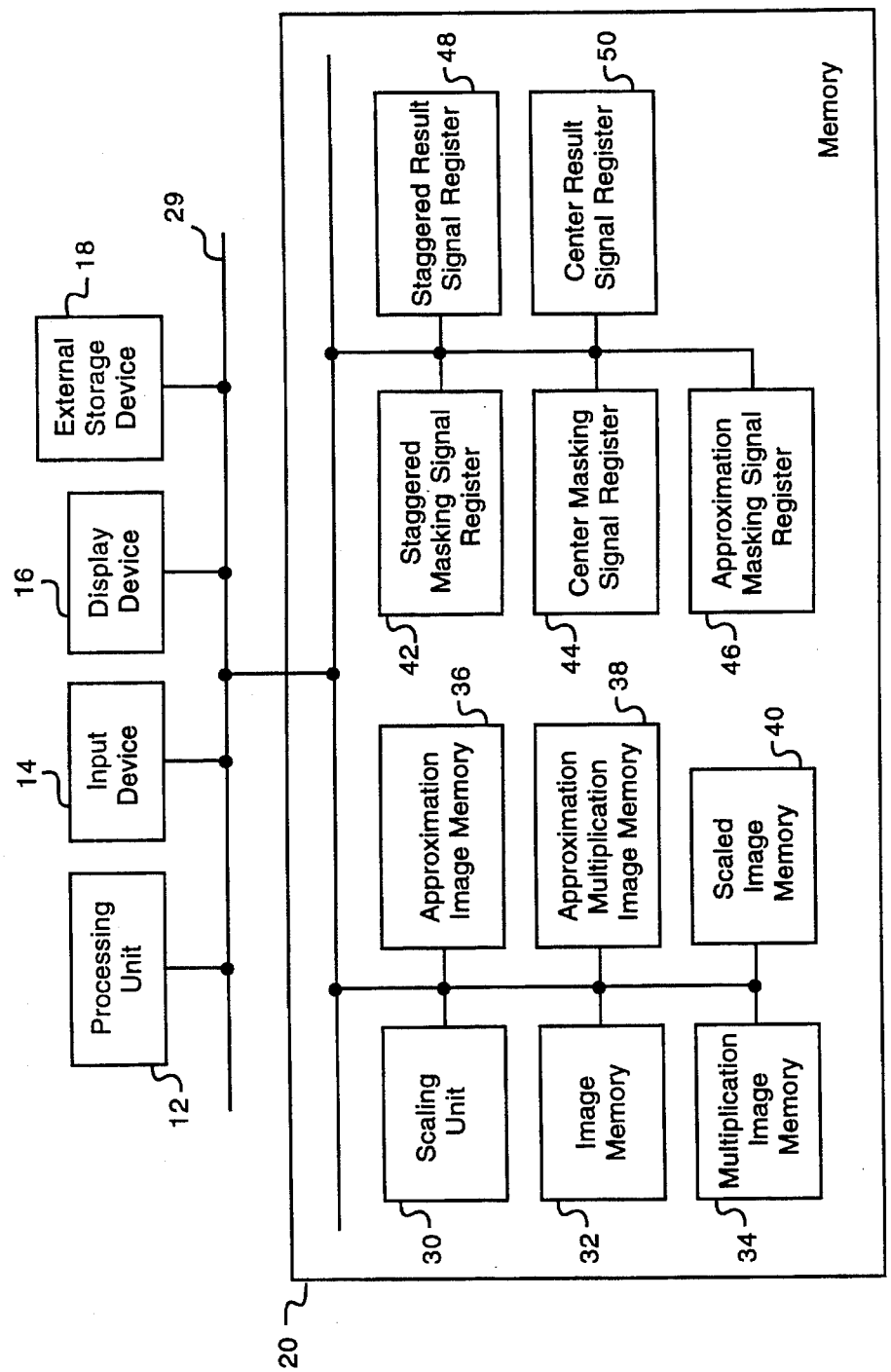
FIG. 2 is a block diagram of a preferred embodiment of a system for bit-masked color signal scaling constructed in accordance with the present invention.

Referring now to FIG. 2, a block diagram of a preferred embodiment of a system 10 for bit-masked color signal scaling constructed in accordance with the present invention is shown. The system 10 preferably comprises a processing unit 12, an input device 14, a display device 16, an external storage device 18, and a memory 20 wherein a scaling unit 30, an image memory 32, a multiplication image memory 34, an approximation image memory 36, an approximation multiplication image memory 38, a color-scaled image memory 40, a staggered masking signal register 42, a center masking signal register 44, an approximation masking signal register 46, a staggered result signal register 48, and a center result signal register 50 reside. Those skilled in the art will recognize that in an alternate embodiment, one or more of the registers 42, 44, 46, 48, 50 within the present invention could be implemented as internal registers within the processing unit 12.

In an exemplary embodiment, the system 10 for bit-masked color signal scaling is an Apple Macintosh computer (Apple Computer, Inc., of Cupertino, Calif.) having a Motorola 68040 central processing unit 12, a keyboard and a mouse-type controller, a 1024 by 786 color graphics monitor, a 120 Megabyte hard disk drive, and 8 Megabytes of memory 20 wherein the scaling unit 30, the image memory 32, the multiplication image memory 34, the approximation image memory 36, the approximation multiplication image memory 38, the color-scaled image memory 40, the staggered masking signal register 42, the center masking signal register 44, the approximation masking signal register 46, the staggered result signal register 48, and the center result signal register 50 reside. Those skilled in the art will recognize that one or more of the aforementioned registers 42, 44, 46, 48, 50 could be implemented using the register set provided by the Motorola 68040 microprocessor.

Figure 1A:
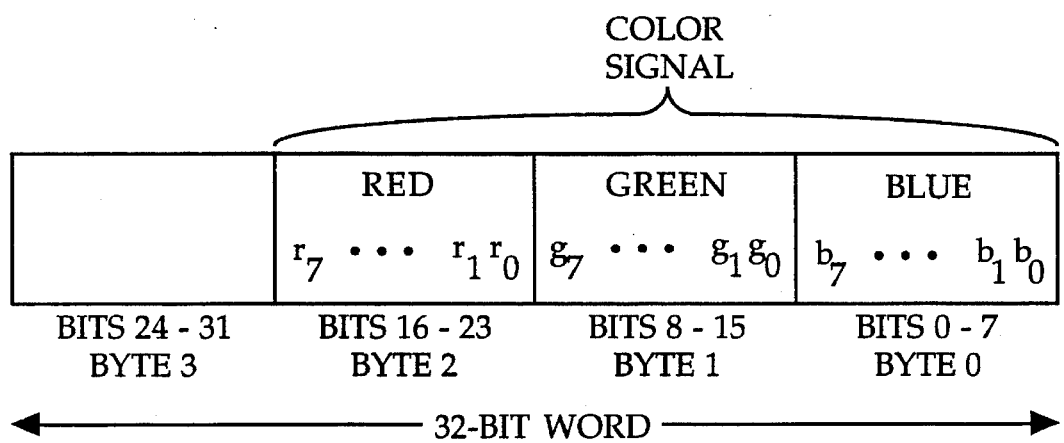
FIG. 1A is a block diagram of a prior art color signal within a computer word.
Figure 1B:
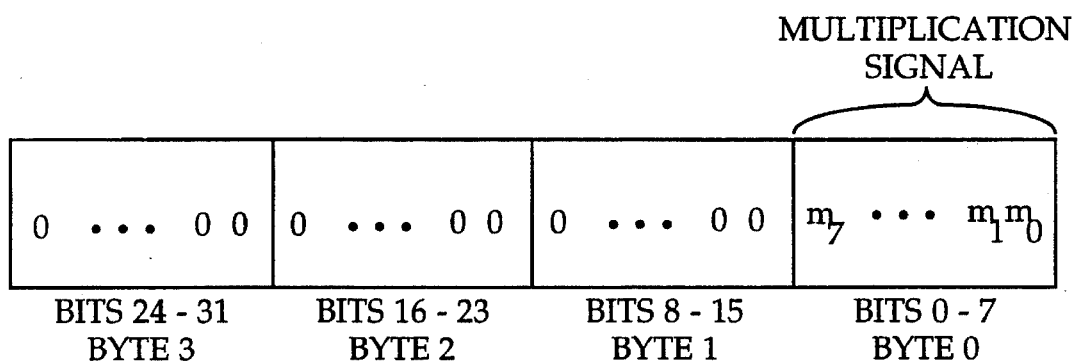
FIG. 1B is a block diagram of a prior art multiplication signal within a computer word.

In the present invention, an image comprises a set of color signals, each of which resides within a computer word. Each color signal corresponds to a picture element, or pixel, within the image. Additionally, each color signal is structurally organized according to a pixel format that represents a particular color space. Referring again to FIG. 1A, a block diagram of a prior art color signal within a computer word is shown. The color signal shown in FIG. 1A corresponds to a conventional Red-Green-Blue (RGB) pixel format. As previously described, each color signal includes a red channel signal, a green channel signal, and a blue channel signal consecutively arranged into a left channel signal position, a center channel signal position, and a right channel signal position within the computer word. Each of the red channel signal, the green channel signal, and the blue channel signal preferably occupy a predetermined number of bits within the computer word, referred to herein as the channel signal size. In the discussion that follows, the channel signal size is taken to be 8 bits, the red channel signal occupies the left channel position, the green channel signal occupies the center channel signal position, and the blue channel signal occupies the right channel signal position within a 32-bit computer word, in accordance with a conventional RGB pixel format. Thus, in FIG. 1, the blue channel signal spans bits b0 through b7 within byte 0. In a like manner, the green channel signal spans bits g0 through g7 within byte 1, and the red channel signal spans bits r0 through r7 within byte 2. Those skilled in the art will recognize that in general, the present invention applies to a computer word containing a first channel signal, a second channel signal, and a third channel signal representing any pixel format, including those pixel formats in which the channel signals do not each span an identical number of bits. Additionally, those skilled in the art will also recognize that another channel signal size, another positional arrangement of the channel signals, and/or another computer word size could be used in an alternate embodiment.

Prior to the display of a given image, image interpolation, image compositing, and/or image shading operations may be required. In the event that such operations are required, each color signal within the image must be scaled according to a corresponding multiplication signal. Referring again to FIG. 1B, a block diagram of a prior art multiplication signal within a computer word is shown. Preferably, the multiplication signal occupies a number of bits equal to the channel signal size. Thus, in FIG. 1B, the multiplication signal spans bits m0 through m7. The set of multiplication signals associated with an image are referred to herein as a multiplication image. During the scaling of a color signal, each channel signal within the color signal is multiplied by a multiplication signal associated with the color signal and obtained from the multiplication image. While color signals within the image are being scaled, and during image display, the image preferably resides within the image memory 32 and the associated multiplication image preferably resides within the multiplication image memory 34. Otherwise, the image and the multiplication image preferably reside upon the external storage device 18.

The scaling unit 30 controls the scaling of color signals within an image according to a corresponding multiplication image. In the preferred embodiment, the scaling unit 30 comprises a sequence of computer program steps that is selectively executed by the processing unit 12. The scaling unit 30 selectively performs either an exact bit-masked color signal scaling or an approximate bit-masked color signal scaling in response to user input received from the input device 14. When performing the exact bit-masked color signal scaling, each color signal within the image is scaled to a level of precision given by the channel signal size. When performing the approximate bit-masked color signal scaling, color signals are scaled to a level of precision less than the channel signal size. In the preferred embodiment, the level of precision associated with the approximate color signal scaling equals one-half of the channel signal size. The operations performed by the scaling unit 30 for both exact and approximate bit-masked color signal scalings are now described.

Figure 3:
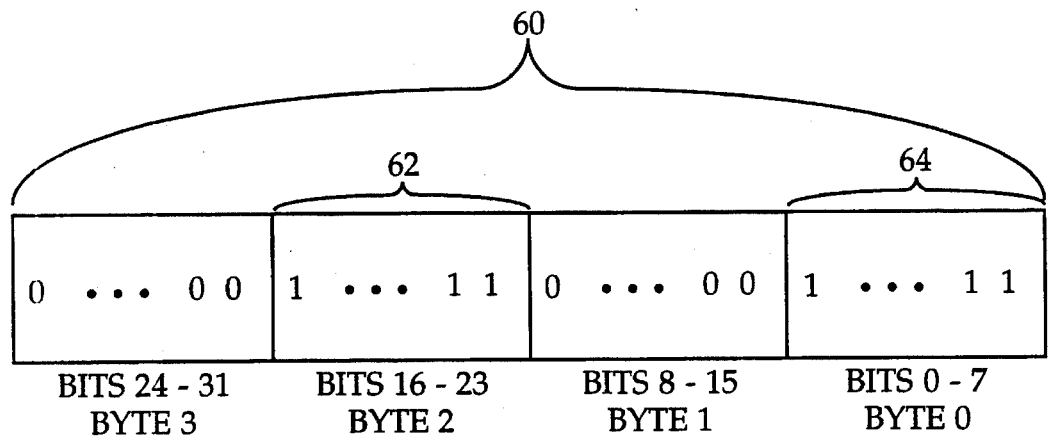
FIG. 3 is a block diagram of a preferred embodiment of a staggered masking signal of the present invention.

In response to an exact scaling request that identifies an image and a corresponding multiplication image, the scaling unit 30 loads the image into the image memory 32 from the external storage device 18. The scaling unit 30 also loads the identified multiplication image into the multiplication image memory 34. The scaling unit 30 next creates a staggered masking signal 60 and a center masking signal 62 in the event that the staggered masking signal and the center masking signal, respectively, have not been previously created. Referring now to FIG. 3, a block diagram of a staggered masking signal is shown. The staggered masking signal 60 comprises a left-position mask 62 of binary "1" signals that occupy the left channel signal position within a computer word; a right-position mask 64 of binary "1" signals that occupy the right channel signal position within the computer word; and binary "0" signals throughout the remaining portions of the computer word. Those skilled in the art will recognize that the masking of a computer word with the staggered masking signal 60 via a logical AND operation results in the preservation of the contents of those portions of the computer word that lie within the left channel signal position and the right channel signal position, and the replacement of the remaining contents of the computer word with binary "0" signals. In the preferred embodiment, the staggered masking signal 60 is stored in the staggered masking signal register 42.

Figure 4:
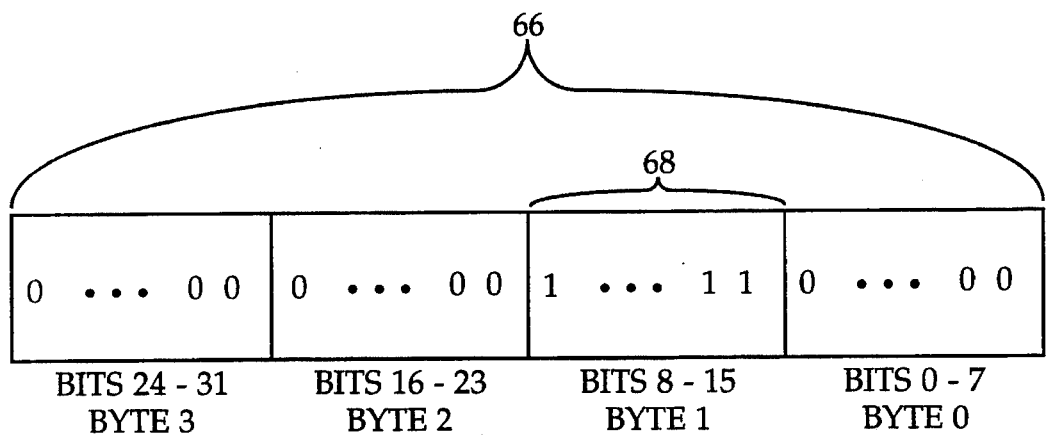
FIG. 4 is a block diagram of a preferred embodiment of a center masking signal of the present invention.

Referring now to FIG. 4, a block diagram of a center masking signal 66 is shown. The center masking signal 66 comprises a center-position mask 68 of binary "1" signals that occupy the center channel signal position within a computer word, and binary "0" signals throughout the remaining portions of the computer word. Those skilled in the art will recognize that the masking of a computer word with the center masking signal 66 via a logical AND operation results in the preservation of the contents of the center channel signal position, and the replacement of the remaining contents of the computer word with binary "0" signals. In the preferred embodiment, the center masking signal 66 is preferably stored in the center masking signal register 44.

After creating the staggered masking signal 60 and the center masking signal 66, or if the staggered and center masking signals 60, 66 were previously created, the scaling unit 30 loads a computer word containing a color signal from the image memory 32 into a memory location or into a register within the processing unit 12. The scaling unit 30 next loads a multiplication signal corresponding to the color signal in an analogous manner. Next, the scaling unit 30 generates a staggered result signal. In the generation of the staggered result signal, the scaling unit 30 first masks the loaded computer word with the staggered masking signal 60 via a logical AND operation. This masking produces a staggered color signal comprising the red channel signal within the left channel signal position, the blue channel signal within the right channel signal position, and binary "0" signals throughout the remaining portions of the computer word. The scaling unit 30 then multiplies the staggered color signal by the multiplication signal, after which the scaling unit 30 normalizes the staggered color signal. The normalization is preferably performed by right-shifting the staggered color signal by a number of bit positions equal to the channel signal size. The scaling unit 30 then masks the normalized staggered color signal with the staggered masking signal 60 via a logical AND operation to produce the staggered result signal. In the preferred embodiment, the staggered result signal is stored in the staggered result signal register 48.

Within the staggered color signal, the red channel signal is surrounded by binary "0" signals, namely, those in the computer word's highest-order byte and those within the center channel signal position. Additionally, the blue channel signal is isolated from the red channel signal by the binary "0" signals that occupy the center channel signal position. The multiplication signal preferably spans a number of bit positions equal to the channel signal size. Therefore, when the staggered color signal and the multiplication signal are multiplied, the red channel signal multiplication result and the blue channel signal multiplication result do not interfere with each other. Thus, the multiplication of the staggered color signal and the multiplication signal successfully performs two multiplications, namely, the multiplication of the red channel signal by the multiplication signal and the multiplication of the blue channel signal by the multiplication signal, in a single step. Moreover, because two multiplications are performed in a single multiplication operation, the present invention eliminates an unpacking step and an associated repacking step required by the prior art.

After generating the staggered result signal, the scaling unit 30 generates a center result signal. In a manner analogous to the generation of the staggered result signal, the scaling unit 30 first masks the loaded computer word containing the color signal under consideration with the center masking signal 66 via a logical AND operation to produce a center color signal. The center color signal comprises the green color signal within the center color signal position, and binary "0" signals throughout the remaining portions of the computer word. The scaling unit 30 subsequently multiplies the center color signal by the multiplication signal, and then normalizes the center color signal. Preferably, the normalization occurs via a right-shift over a number of bit positions equal to the channel signal size. After the normalization, the scaling unit 30 masks the center color signal with the center masking signal 66, thus producing the center result signal. In the preferred embodiment, the center result signal is stored in the center result signal register 50.

The scaling unit 30 adds the staggered result signal and the center result signal to produce the scaled color signal, and stores the scaled color signal in the scaled image memory 40. Those skilled in the art will recognize that the scaled color signal can also be created via a logical OR operation between the staggered color signal and the center color signal. In the preferred embodiment, the scaling unit 30 preferably repeats the steps described above for each color signal within the image that requires scaling.

When color signals within an image are scaled in response to an exact scaling request, only two multiplications are required per color signal. That is, a first multiplication is performed during the generation of the staggered result signal, and a second multiplication is performed during the generation of the center result signal. Because multiplication operations are particularly time-intensive, the elimination of one multiplication operation by the present invention when compared to the prior art results in a significant reduction in the time required to scale the color signals within an entire image. For example, for an image having 1024 by 768 pixels, the present invention eliminates more than 700,000 multiplication operations. A further performance enhancement results because more than 700,000 unpacking and more than 700,000 associated repacking operations are also eliminated.

Those skilled in the art will recognize that in certain image processing applications, a computer word containing a color signal may contain additional information. For example, in the computer word shown in FIG. 1A, an opacity signal may be present within the high-order byte. When such additional information is present, the scaling unit 30 performs an unpacking step to save the additional information prior to performing the color signal scaling as described above. After the scaled color signal has been generated, the scaling unit 30 repacks the computer word containing the scaled color signal with the original additional information.

Figure 5:
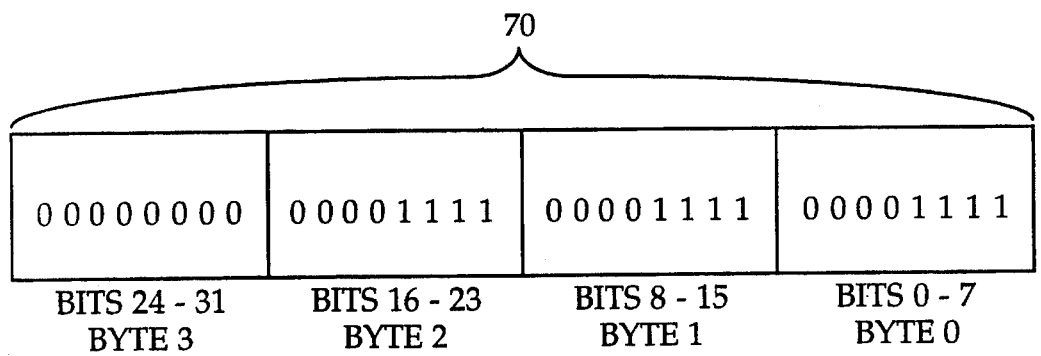
FIG. 5 is a block diagram of a preferred embodiment of an approximation masking signal of the present invention.

In response to an approximate scaling request that identifies an image and a corresponding multiplication image, the scaling unit 30 loads the image and the corresponding multiplication image into the image memory 32 and the multiplication image memory 34, respectively. The scaling unit 30 then creates an approximation masking signal 70 in the event that the approximation masking signal 70 does not already exist. Referring now to FIG. 5, a block diagram of a preferred embodiment of an approximation masking signal 70 is shown. The approximation masking signal 70 preferably comprises binary "1" signals in a predetermined number of low-order bit positions within each of the left channel signal position, the center channel signal position, and the right channel signal position; binary "0" signals in the remaining bit positions within each of the left, center, and right channel signal positions; and binary "0" signals in the remaining portions of the computer word. For simplicity, the case in which the predetermined number of low-order bit positions containing binary "1" signals is equal to one-half of the channel signal size is considered herein. Those skilled in the art will recognize that in general, additional or fewer low-order bit positions could contain binary "1" signals in an alternate embodiment. Moreover, those skilled in the art will recognize that the approximation masking signal 70 would have an analogous structure for pixel formats in which the channel signals do not each span an identical number of bit positions. In the preferred embodiment, the approximation masking signal 70 is stored in the approximation masking signal register 46.

Figure 6A:
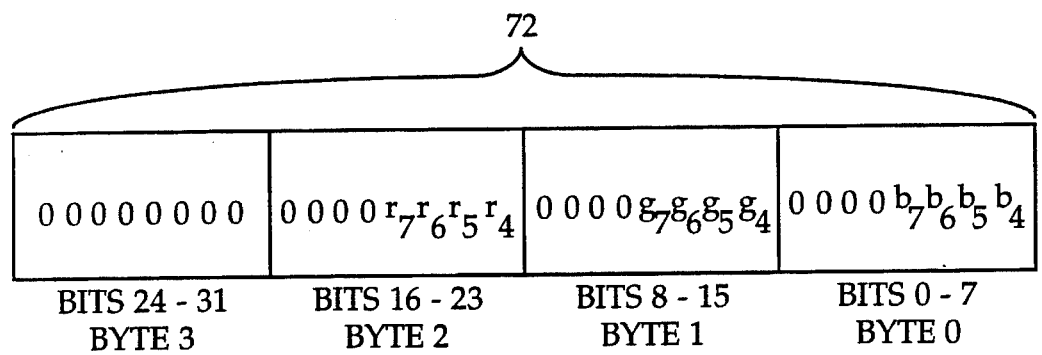
FIG. 6A is a block diagram of a preferred embodiment of an approximation color signal of the present invention.

Following the creation of the approximation masking signal 70, or in the event that the approximation masking signal 70 had been previously created, the scaling unit 30 generates an approximation image corresponding to the loaded image in the event that the approximation image does not already exist. In the generation of approximation image, the scaling unit 30 generates an approximation color signal 72 corresponding to each color signal within the original image. Referring now to FIG. 6A, a block diagram of a preferred embodiment of an approximation color signal 72 is shown. Each approximation color signal 72 is a reduced-precision version of a particular color signal. In the creation of an approximation color signal 72 corresponding to a given color signal, the scaling unit 30 first right-shifts the contents of the computer word in which the color signal resides by a number of bit positions equal to the predetermined number of low-order bit positions within each of the approximation masking signal's left, center, and right channel signal positions that contain binary "1" signals. Herein, the channel signal size is 8 bits, and the predetermined number of low-order bit positions within each channel signal position in the approximation masking signal 70 that contain binary "1" signals is given by one-half of the channel signal size. Thus, for the case considered herein, the contents of the computer word containing the color signal is right-shifted by 4 bit positions.

The scaling unit 30 next masks the computer word containing the right-shifted color signal with the approximation masking signal 70 via a logical AND operation. As can be seen in FIG. 6A, the left channel signal position within the approximation color signal 72 contains bits r4 through r7 of the original red channel signal in the four lowest-order bit positions, and binary "0" signals in the remaining bit positions. The center channel signal position within the approximation color signal 72 contains bits g4 through g7 of the original green channel signal in the four lowest-order bit positions, and binary "0" signals in the remaining bit positions. Finally, the right channel signal position within the approximation color signal 72 contains bits b4 through b7 of the original blue channel signal in the four lowest-order bit positions, and binary "0" signals in the remaining bit positions. Thus, each channel signal in the approximation color signal 72 has a level of precision given by one-half of the channel signal size. Those skilled in the art will recognize that in general, the approximation color signal's level of precision will correspond to the predetermined number of low-order bit positions that contain binary "1" signals within each of the channel signal positions in the approximation masking signal 70.

Each approximation color signal 72 is a truncated, or quantized, version of a given color signal. Thus, an error has been introduced into each approximation color signal 72 due to the quantization. This error makes the color transition from one approximation color signal 72 to an adjacent approximation color signal 72 more abrupt than the corresponding transition between color signals in the original image. To minimize the error introduced as a result of quantization, the scaling unit 30 performs a conventional dithering upon the approximation color signal 72. In the preferred embodiment, the dithering is accomplished by a conventional error diffusion technique, in which approximation color signal error is averaged over multiple pixel positions. Those skilled in the art will recognize that in general, any dithering technique, such as an ordered dither or a random-number-based dither, could be applied to the approximation color signal 72. In the preferred embodiment, the scaling unit 30 stores each approximation color signal 72 in the approximation image memory 36.

Figure 6B:
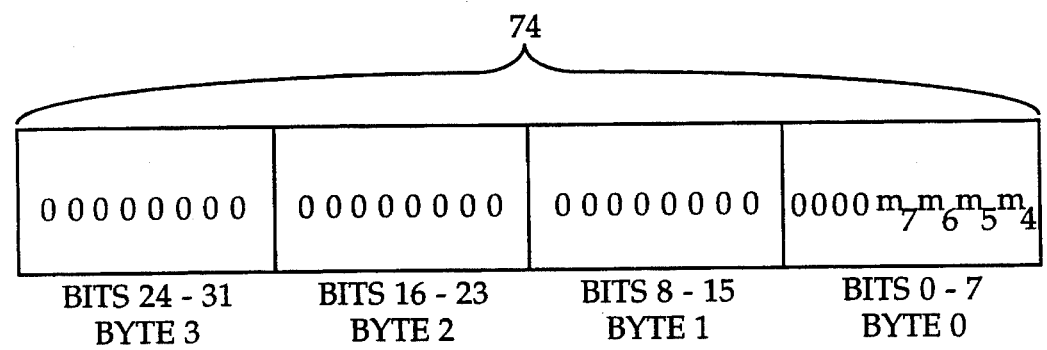
FIG. 6B is a block diagram of a preferred embodiment of an approximation multiplication signal of the present invention.

In the event that an approximation image was created, the scaling unit 30 also creates an approximation multiplication image. The approximation multiplication image is created from the multiplication image associated with the loaded original image. In the creation of the approximation multiplication image, the scaling unit 30 creates an approximation multiplication signal 74 corresponding to each multiplication signal within the original multiplication image. Referring now to FIG. 6B, a block diagram of a preferred embodiment of an approximation multiplication signal 74 is shown. Each approximation multiplication signal 74 is a reduced-precision version of a particular multiplication signal. The scaling unit 30 creates the approximation multiplication signal 74 by right-shifting the computer word in which the multiplication signal resides by a number of bit positions equal to the channel signal size minus the predetermined number of bit positions within each of the approximation masking signal's channel signal positions that contain binary "1" signals. Thus, for the case considered herein, the multiplication signal is right-shifted by a number of bit positions equal to one-half of the channel signal size to create the approximation multiplication signal 74. As shown in FIG. 6B, the approximation multiplication signal 74 contains bits m4 through m7 of the original multiplication signal in the four lowest-order bit positions of the computer word, and binary "0" signals in the remaining bit positions of the computer word. Those skilled in the art will recognize that it is assumed herein that the bit positions to the left of bit m7 within the multiplication signal contain binary "0" signals, thereby eliminating the need for a masking step in the creation of the approximation multiplication signal 74. In an alternate embodiment, a masking step could be provided during the creation of the approximation masking signal 74.

Those skilled in the art will recognize that each approximation multiplication signal 74 is a quantized version of a given multiplication signal, and therefore an error has been introduced into the approximation multiplication signal 74 as a result of the quantization. To minimize this error, the scaling unit 30 performs a conventional dithering upon the approximation multiplication signal 74 in a manner analogous to that described above for the approximation color signal 72. Preferably, the dithering applied to the approximation multiplication signal 74 is accomplished by a conventional error diffusion technique. Those skilled in the art will recognize that another dithering technique, such as an ordered dither or a random-number-based dither, can be applied to the approximation multiplication signal 72 in an alternate embodiment. In the preferred embodiment, the approximation multiplication signal 74 is stored in the approximation multiplication image memory 38.

To complete the approximate color signal scaling, the scaling unit 30 multiplies each approximation color signal 72 within the approximation image by a corresponding approximation multiplication signal 74, thereby producing an approximate scaled color signal. Each approximate scaled color signal is stored in the scaled image memory 40. In the case considered herein, the approximation color signal 72 and the approximation multiplication signal 74 each have a level of precision equal to one-half the channel signal size. Therefore, their multiplication does not produce any result overflow between channel signal positions. Those skilled in the art will recognize that in general, if the approximation color signal 72 has k bits of precision, the approximation multiplication signal 74 must have (s–k) bits of precision, where s represents the channel signal size, to prevent multiplication result overflow between channel signal positions. An analogous relationship applies in those pixel formats in which each channel signal does not span an identical number of bit positions. In the preferred embodiment, the scaling unit 30 adjusts the level of precision according to which approximate color signal scalings are performed in response to a user command received through the input device 14. Those skilled in the art will recognize that for a smoothly-varying image, a higher level of approximation color signal precision is desirable.

Because no overflow between channel signal positions occurs in the approximate scaling, the generation of a staggered color signal and a center color signal, as is done in the exact scaling described above, is unnecessary. The approximate color signal scaling requires only one multiplication operation per approximation color signal. Thus, when compared to the prior art, the approximate scaling reduces the time required to scale the set of color signals within an image by more than one-third.

Approximate color signal scaling is particularly useful in an image processing environment in which the color signals within an image must be scaled according to a multiplication image that is interactively modified. For each interactive modification to the multiplication image, the scaling unit 30 generates a new approximation multiplication image and performs the required approximate color signal scalings upon the approximation image in the manner described above. Those skilled in the art will recognize that in an alternate embodiment, when the new approximation multiplication image is generated, the dithering performed upon each approximation multiplication signal 74 could be omitted to further reduce the overall amount of time required to perform the required approximate color signal scalings.

Figure 7:
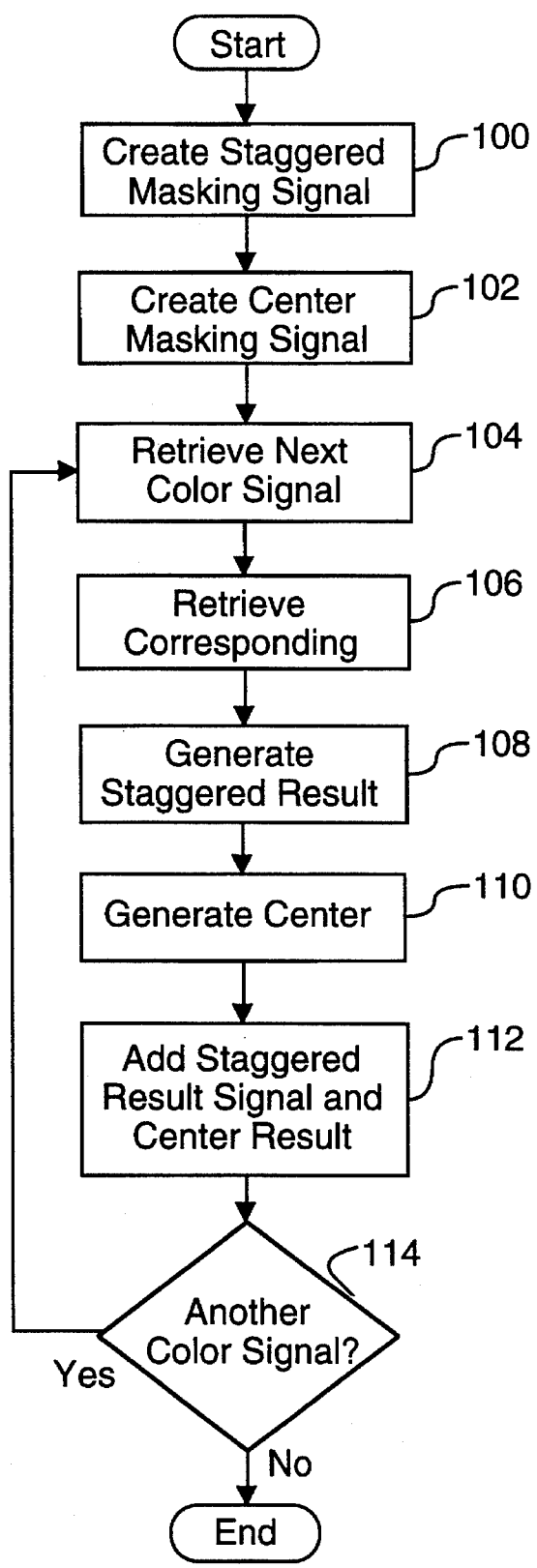
FIG. 7 is a flowchart of a preferred method for exact bit-masked color signal scaling in accordance with the present invention.

Referring now to FIG. 7, a flowchart of a preferred method for exact bit-masked color signal scaling is shown. The preferred method begins in step 100 with the scaling unit 30 creating the staggered masking signal 60. Next, in step 102, the scaling unit creates the center masking signal 66. After creating the center masking signal 66, the scaling unit 30 retrieves a next color signal from an image stored in the image memory 32, and loads the color signal into a memory location or into a register within the processing unit 12 in step 104. Next, in step 106, the scaling unit 30 retrieves a corresponding multiplication signal from the multiplication image memory 34, and loads the multiplication signal into a memory location or into a processing unit register.

After step 106, the scaling unit 30 generates a staggered result signal and a center result signal in steps 108 and 110, respectively. The staggered result signal and the center result signal are preferably generated in the manner described above. Next, in step 112, the scaling unit 30 adds the staggered result signal and the center result signal to produce a scaled color signal. The scaled color signal is preferably stored in the scaled image memory 40. Following step 112, the scaling unit 30 determines whether another color signal within the image is to be scaled in step 114. If so, the preferred method returns to step 104. If no other color signals are to be scaled, the preferred method ends.

Figure 8A:
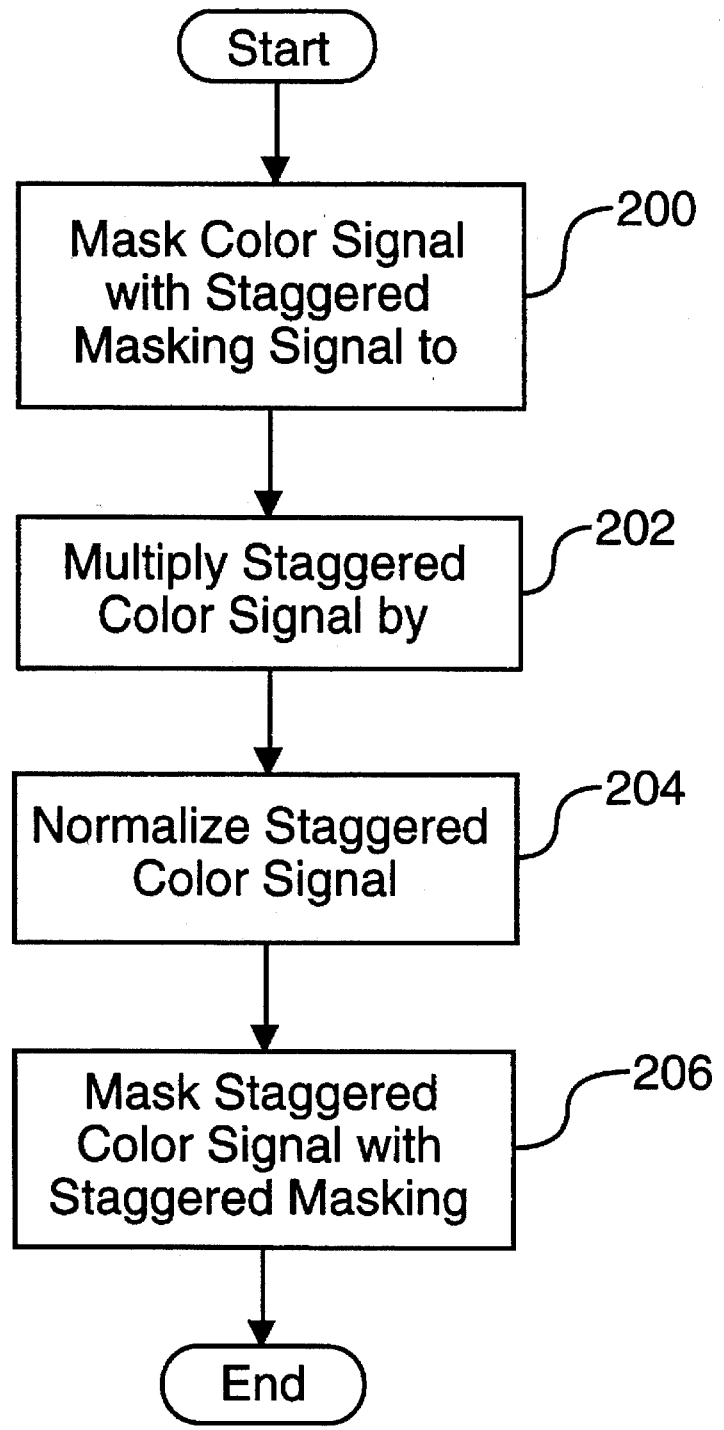
FIG. 8A is a flowchart of a preferred method for generating a staggered result signal in the present invention.

Referring now to FIG. 8A, a flowchart of a preferred method for generating a staggered result signal (step 108 of FIG. 7) is shown. The preferred method begins in step 200 with the scaling unit 30 masking the color signal that was retrieved in step 104 of FIG. 7 with the staggered masking signal 60 via a logical AND operation, thereby generating a staggered color signal having the structure described above. Next, the scaling unit 30 multiplies the staggered color signal by the multiplication signal in step 202. After step 202, the scaling unit 30 normalizes the staggered color signal in step 204. Preferably, the normalization is performed by right-shifting the staggered color signal by a number of bit-positions equal to the channel signal size. Finally, the scaling unit 30 masks the normalized staggered color signal with the staggered masking signal 60 via a logical AND operation, thereby generating the staggered result signal. Preferably, the staggered result signal is stored in the staggered result signal register 48.

Figure 8B:
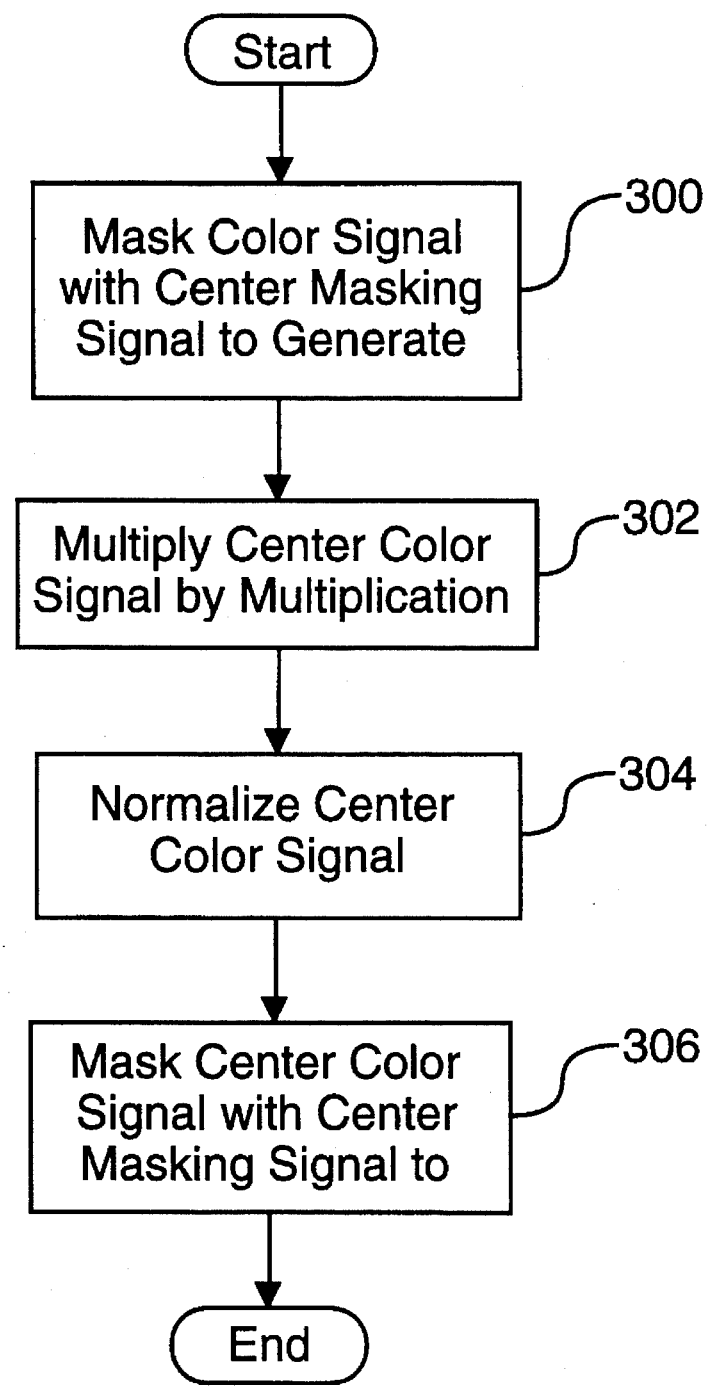
FIG. 8B is a flowchart of a preferred method for generating a center result signal in the present invention.

Referring now to FIG. 8B, a flowchart of a preferred method for generating a center result signal (step 110 of FIG. 7) is shown. The preferred method begins in step 300 with the scaling unit 30 masking the color signal with the center masking signal 66 to produce a center color signal having the structure described above. Preferably, the masking performed in step 300 comprises a logical AND operation. After step 300, the scaling unit 30 multiplies the center color signal by the multiplication signal in step 302. The scaling unit 30 next normalizes the center color signal in step 304, where the normalization preferably occurs by right-shifting the center color signal by a number of bit positions equal to the channel signal size. Finally, in step 306, the scaling unit 30 masks the normalized center color signal with the center masking signal 66 via a logical AND operation, thereby generating the center result signal.

Figure 9:
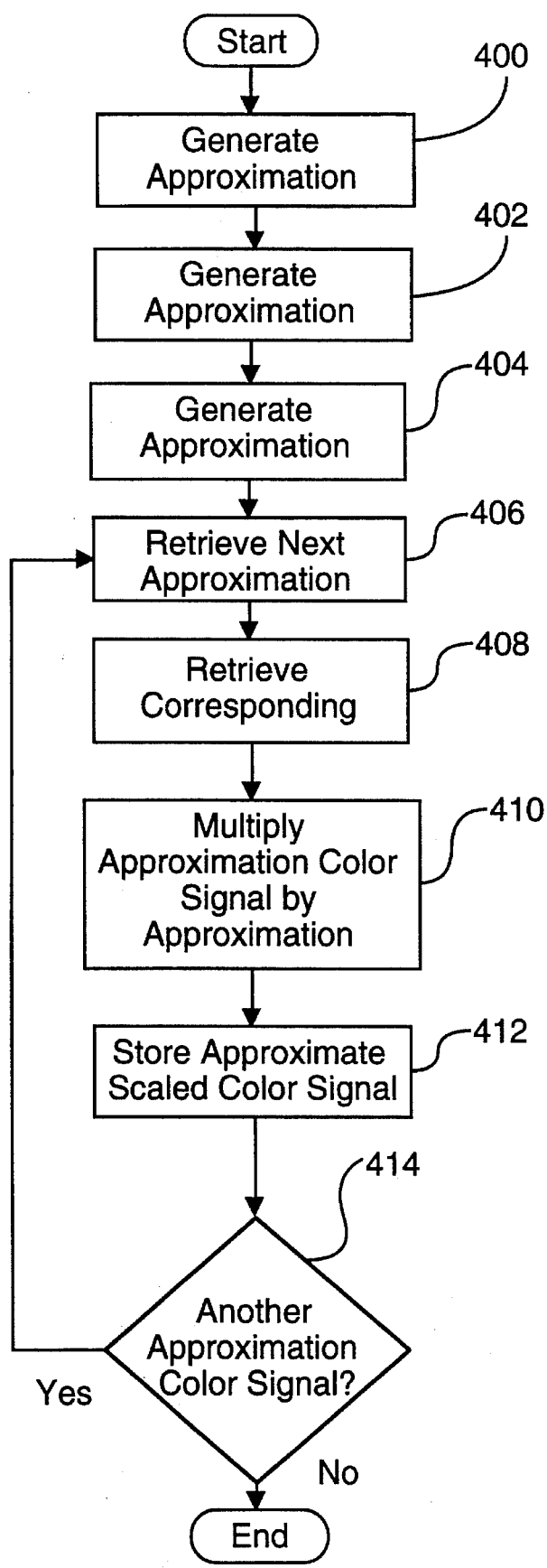
FIG. 9 is a flowchart of a preferred method for approximate bit-masked color signal scaling in accordance with the present invention.

Referring now to FIG. 9, a flowchart of a preferred method for approximate bit-masked color signal scaling is shown. Preferably, the scaling unit 30 performs an approximate bit-masked color signal scaling in response to an approximate scaling request that identifies an image and a corresponding multiplication image. The preferred method begins in step 400 with the scaling unit 30 generating an approximation masking signal 70, where the approximation masking signal 70 has the structure described above. Next, the scaling unit 30 generates an approximation image corresponding to the identified image in step 402. In the generation of the approximation image, the scaling unit 30 creates an approximation color signal 72 for each color signal within the identified image, in the manner previously described and further detailed below with reference to FIG. 10A. After generating the approximation image, the scaling unit 30 generates an approximation multiplication image corresponding to the identified multiplication image in step 404. In step 404, the scaling unit 30 creates an approximation multiplication signal 74 corresponding to each multiplication signal within the identified multiplication image, in the manner previously described and further detailed below with reference to FIG. 10B.

Following step 404, the scaling unit 30 retrieves a next approximation color signal 72 from the approximation image memory 36, and loads the approximation color signal 72 into a memory location or a processing unit register in step 406. After step 406, the scaling unit 30 retrieves a corresponding approximation multiplication signal 74 from the approximation multiplication image memory 38, and loads the approximation multiplication signal into a memory location or into a processing unit register in step 408. Following step 408, the scaling unit 30 multiplies the approximation color signal 72 and the approximation multiplication signal 74 in step 410, thereby producing an approximate scaled color signal. The scaling unit 30 next stores the approximate scaled color signal in the scaled image memory in step 412. After step 412, the scaling unit 30 determines in step 414 whether another approximation color signal 72 within the approximation image requires consideration. If so, the preferred method returns to step 406. Thus, steps 406 through 414 are performed for each approximation color signal 72 in the approximation image. Once each approximation color signal 72 within the approximation image has been considered, the preferred method ends.

Those skilled in the art will recognize that in an interactive environment in which multiple approximate scalings are required in response to a multiplication image update, steps 404 through 414 are performed for each update of a given multiplication image.

Figure 10A:
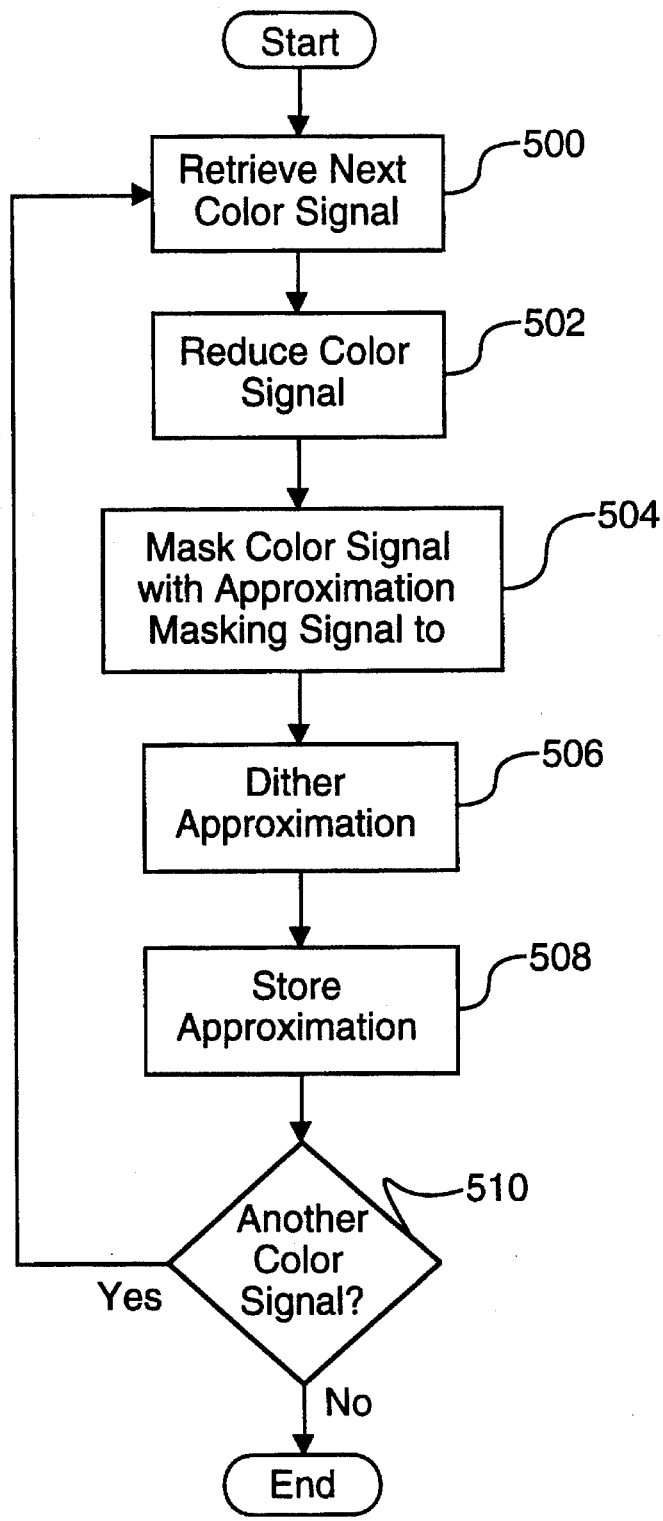
FIG. 10A is a flowchart of a preferred method for generating an approximation image in the present invention.

Referring now to FIG. 10A, a flowchart of a preferred method for generating an approximation image (step 402 of FIG. 9) is shown. The preferred method begins in step 500 with the scaling unit 30 retrieving a next color signal from the image memory 32. Next, the scaling unit 30 reduces the precision of each of the red channel signal, the green channel signal, and the blue channel signal within the color signal in step 502. Preferably, the scaling unit 30 performs step 502 by right-shifting the computer word containing the color signal by a number of bit positions equal to the predetermined number of bit positions within the approximation masking signal 70 that contain binary "1" signals within each of the left, center, and right channel signal positions. After step 502, the scaling unit 30 masks the reduced-precision color signal with the approximation masking signal 70 via a logical AND operation, thereby producing the approximation color signal 72 in step 504. The scaling unit 30 then dithers the approximation color signal in step 506, preferably through a conventional error diffusion technique as described above. Next, the scaling unit 30 stores the approximation color signal in step 508, preferably in the approximation image memory 36. After step 508, the scaling unit 30 determines whether another color signal within the image requires consideration in step 510. If so, the preferred method returns to step 500. Thus, steps 500 through 510 are performed for each color signal within the image. After each color signal within the image has been considered, the preferred method ends.

Figure 10B:
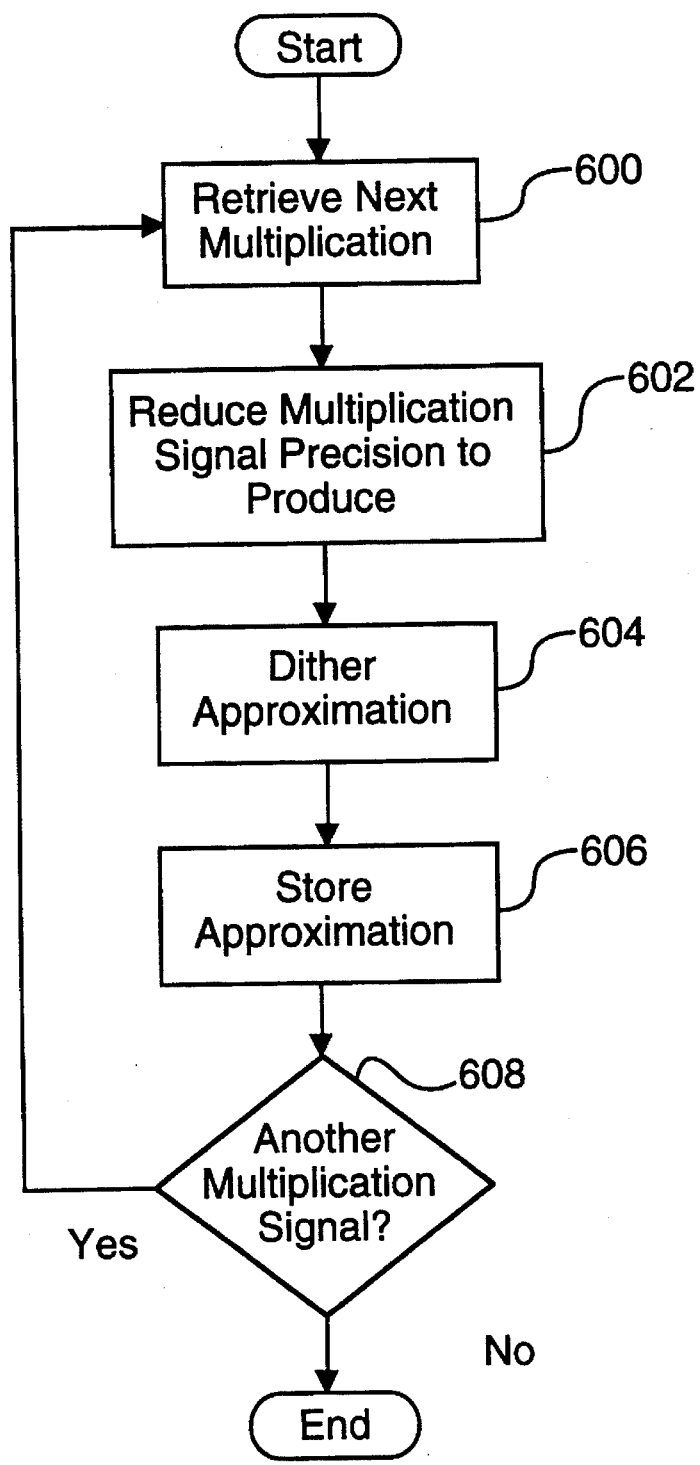
FIG. 10B is a flowchart of a preferred method for generating an approximation multiplication image in the present invention.

Referring now to FIG. 10B, a flowchart of a preferred method for generating an approximation multiplication image (step 404 of FIG. 9) is shown. The preferred method begins in step 600 with the scaling unit 30 retrieving a next multiplication signal from the multiplication image memory 34. The scaling unit 30 next reduces the precision of the multiplication signal to produce the approximation multiplication signal in step 602. In step 602, the scaling unit 30 preferably right shifts the multiplication signal by a number of bit positions equal to the channel signal size minus the predetermined number of bit positions in each of the left, center, and right channel positions within the approximation masking signal 70 that contain binary "1" signals. After step 602, the scaling unit 30 dithers the approximation multiplication signal in step 604, preferably through a conventional error diffusion dithering technique as described above. Next, the scaling unit 30 stores the approximation multiplication signal in step 606. In step 606, the approximation multiplication signal is preferably stored in the approximation multiplication image memory. Following step 606, the scaling unit 30 determines whether another multiplication signal within the multiplication image requires consideration in step 608. If so, the preferred method returns to step 600. Thus, steps 600 through 608 are performed for each multiplication signal within the multiplication image. Once each multiplication signal within the multiplication image has been considered, the preferred method ends.

While the present invention has been described with reference to certain preferred embodiments, those skilled in the art will recognize that various modifications may be provided. Variations upon and modifications to the preferred embodiments are provided for by the present invention, which is limited only by the following claims.

What is claimed is:

1. In a computer system having a processing unit and a memory wherein an image memory, a multiplication image memory, and a scaling unit reside, a method for scaling a color signal comprising a first channel signal, a second channel signal, and a third channel signal, the method comprising the steps of:

creating a staggered masking signal for masking the first channel signal and the third channel signal of a computer word;

creating a center masking signal for masking the second channel signal of the computer word;

retrieving the color signal;

retrieving a multiplication signal associated with the color signal, the multiplication signal indicating a value by which each of the first, second, and third channel signals are to be multiplied;

generating a staggered result signal via a single multiplication operation, the staggered result signal including a first multiplication result portion corresponding to the multiplication of the first channel signal by the multiplication signal and a second multiplication result portion corresponding to the multiplication of the third channel signal by the multiplication signal;

generating a center result signal, the center result signal including a third multiplication result portion corresponding to the multiplication of the second channel signal by the multiplication signal; and adding the staggered result signal and the center result signal to produce a scaled color signal.

2. The method of claim 1, wherein the step of generating the staggered result signal comprises the step of multiplying a staggered color signal by the multiplication signal.

3. The method of claim 2, wherein the staggered color signal is generated by performing a step of masking the color signal with the staggered masking signal.

4. The method of claim 3, wherein the step of masking comprises a logical AND operation.

5. The method of claim 2, wherein the step of generating the staggered result signal further comprises the steps of:

normalizing the result of the multiplication of the staggered color signal and the multiplication signal; and masking the result of the step of normalizing with the staggered masking signal.

6. The method of claim 5, wherein the step of normalizing comprises a right-shift operation.

7. The method of claim 1, wherein the step of generating the center result signal comprises the step of multiplying a center color signal by the multiplication signal.

8. The method of claim 7, wherein the center color signal is generated by masking the color signal with the center masking signal.

9. The method of claim 8, wherein the masking comprises a logical AND operation.

10. The method of claim 7, wherein the step of generating the center result signal further comprises the steps of:

normalizing the result of the multiplication of the center color signal and the multiplication signal; and masking the result of the step of normalizing with the center masking signal.

11. The method of claim 10, wherein the step of normalizing comprises a right-shift operation.

12. In a computer system having a processing unit and a memory wherein an image memory, a multiplication image memory, and a scaling unit reside, a method for scaling a color signal comprising a first channel signal, a second channel signal, and a third channel signal, the method comprising the steps of:

retrieving the color signal;

retrieving a multiplication signal associated with the color signal;

generating an approximation color signal, having a first approximation channel signal, a second approximation channel signal and a third approximation channel signal;

generating an approximation multiplication signal; and generating an approximate scaled color signal via a single multiplication operation, the approximate scaled color signal including a first multiplication result portion corresponding to the multiplication of the first approximation channel signal by the approximation multiplication signal, a second multiplication result portion corresponding to the multiplication of the second approximation channel signal by the approximation multiplication signal, and a third multiplication result portion corresponding to the multiplication of the third approximation channel signal by the approximation multiplication signal.

13. The method of claim 12, wherein the step of generating the approximation color signal comprises the step of masking the color signal with an approximation masking signal.

14. The method of claim 13, wherein the approximation masking signal comprises binary "1" signals within a predetermined number of bit positions within each of the first channel signal, the second channel signal, and the third channel signal within a computer word.

15. The method of claim 13, wherein the step of generating the approximation color signal further comprises the step of right-shifting the masked color signal.

16. The method of claim 12, wherein the step of generating the approximation multiplication signal comprises the step of right-shifting the multiplication signal.

17. In a computer system having a processing unit and a memory wherein an image memory, a multiplication image memory, and a scaling unit reside, an apparatus for scaling a color signal comprising a first channel signal, a second channel signal, and a third channel signal, the apparatus comprising:

means for creating a staggered masking signal for masking the first channel signal and the third channel signal of a computer word;

means for creating a center masking signal for masking the second channel signal of the computer word;

means for retrieving the color signal;

means for retrieving a multiplication signal associated with the color signal, the multiplication signal indicating a value by which each of the first, second, and third channel signals are to be multiplied;

means for generating a staggered result signal via a single multiplication operation, the staggered result signal including a first multiplication result portion corresponding to the multiplication of the first channel signal by the multiplication signal and a second multiplication result portion corresponding to the multiplication of the third channel signal by the multiplication signal;

means for generating a center result signal, the center result signal including a third multiplication result portion corresponding to the multiplication of the second channel signal by the multiplication signal; and means for adding the staggered result signal and the center result signal to produce a scaled color signal.

18. In a computer system having a processing unit and a memory wherein an image memory, a multiplication image memory, and a scaling unit reside, an apparatus for scaling a color signal comprising a first channel signal, a second channel signal, and a third channel signal, the apparatus comprising:

means for retrieving the color signal;

means for retrieving a multiplication signal associated with the color signal;

means for generating an approximation color signal, having a first approximation channel signal, a second approximation channel signal and a third approximation channel signal;

means for generating an approximation multiplication signal; and means for generating an approximate scaled color signal via a single multiplication operation, the approximate scaled color signal including a first multiplication result portion corresponding to the multiplication of the first approximation channel signal by the approximation multiplication signal, a second multiplication result portion corresponding to the multiplication of the second approximation channel signal by the approximation multiplication signal, and a third multiplication result portion corresponding to the multiplication of the third approximation channel signal by the approximation multiplication signal.

19. The apparatus for scaling a color signal of claim 18, further comprising a means for generating an approximation masking signal.

* * * * *